United States Patent
Ryan et al.

(10) Patent No.: US 10,243,647 B2
(45) Date of Patent: Mar. 26, 2019

(54) AIRCRAFT VISUAL SENSOR SYSTEM

(71) Applicant: Bell Helicopter Textron Inc., Fort Worth, TX (US)

(72) Inventors: Michael John Ryan, Colleyville, TX (US); Joseph Scott Drennan, Dallas, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 39 days.

(21) Appl. No.: 15/608,968

(22) Filed: May 30, 2017

(65) Prior Publication Data

US 2018/0351634 A1    Dec. 6, 2018

(51) Int. Cl.
| | |
|---|---|
| *H04B 7/185* | (2006.01) |
| *H04N 21/218* | (2011.01) |
| *G08B 5/00* | (2006.01) |

(52) U.S. Cl.
CPC ... *H04B 7/18506* (2013.01); *H04N 21/21805* (2013.01); *G08B 5/00* (2013.01); *H04N 2201/0087* (2013.01); *H04N 2201/0089* (2013.01)

(58) Field of Classification Search
USPC .................................. 382/100, 103; 701/3
See application file for complete search history.

(56) References Cited

U.S. PATENT DOCUMENTS

| | | | |
|---|---|---|---|
| 5,371,581 A | 12/1994 | Wangler et al. | |
| 6,243,482 B1* | 6/2001 | Eibert | G01S 7/4802 342/65 |
| 7,061,401 B2* | 6/2006 | Voos | G08G 5/0013 340/961 |
| 8,473,189 B2* | 6/2013 | Christoph | B64C 27/006 244/17.11 |
| 9,177,482 B1* | 11/2015 | Reinke | G06T 7/62 |
| 9,196,168 B2 | 11/2015 | McCollough et al. | |
| 9,830,713 B1* | 11/2017 | Walker | B64C 39/024 |
| 9,911,344 B2* | 3/2018 | Kabrt | G06K 9/00664 |
| 10,053,226 B2* | 8/2018 | Leland | B64D 43/02 |
| 2010/0292868 A1* | 11/2010 | Rotem | G05D 1/0038 701/2 |
| 2010/0299067 A1* | 11/2010 | McCollough | G01S 13/9303 701/301 |
| 2012/0029738 A1* | 2/2012 | Brunetti | G08G 5/0078 701/11 |

(Continued)

FOREIGN PATENT DOCUMENTS

WO    WO 2016/200270    12/2016

*Primary Examiner* — Ishrat I Sherali
(74) *Attorney, Agent, or Firm* — Patent Capital Group (57) ABSTRACT

In one embodiment, an apparatus comprises a processing device configured to: obtain sensor data from one or more sensors associated with an aircraft, wherein the one or more sensors are configured to detect information associated with an operating environment of the aircraft; detect an object near the aircraft based on the sensor data; obtain a camera feed from a camera associated with the aircraft, wherein the camera feed comprises a camera view of at least a portion of the aircraft; generate a display output based on the camera feed and the sensor data, wherein the display output comprises a visual perspective of the object relative to the aircraft; and cause the display output to be displayed on a display device.

25 Claims, 6 Drawing Sheets

(56) References Cited

U.S. PATENT DOCUMENTS

| | | | |
|---|---|---|---|
| 2014/0327770 A1* | 11/2014 | Wagreich | G05D 1/0038 |
| | | | 348/148 |
| 2016/0039529 A1 | 2/2016 | Buchmueller et al. | |
| 2016/0272340 A1* | 9/2016 | Leland | B64D 43/02 |
| 2017/0025024 A1* | 1/2017 | Kabrt | G06K 9/00664 |
| 2017/0225680 A1* | 8/2017 | Huang | B60W 30/09 |

* cited by examiner

AIRCRAFT VISUAL SENSOR SYSTEM

TECHNICAL FIELD

This disclosure relates generally to aircraft, and more particularly, though not exclusively, to an aircraft visual sensor system.

BACKGROUND

There are many hazards that may arise during operation of rotorcraft and other aircraft, including collisions, contact with moving components (e.g., rotors, propellers, and jet engine intakes), landing on dangerous surfaces, and so forth. For example, the rotors of a rotorcraft (e.g., the main rotor and/or tail rotor) present a risk of contact with objects, such as people, animals, structures (e.g., buildings, powerlines), terrain (e.g., the ground and other landing surfaces), and so forth. Moreover, many hazards may be difficult for a pilot to identify, as they may be outside the pilot's field of view or otherwise difficult for the pilot to see.

SUMMARY

According to one aspect of the present disclosure, an apparatus comprises a processing device configured to: obtain sensor data from one or more sensors associated with an aircraft, wherein the one or more sensors are configured to detect information associated with an operating environment of the aircraft; detect an object near the aircraft based on the sensor data; obtain a camera feed from a camera associated with the aircraft, wherein the camera feed comprises a camera view of at least a portion of the aircraft; generate a display output based on the camera feed and the sensor data, wherein the display output comprises a visual perspective of the object relative to the aircraft; and cause the display output to be displayed on a display device.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1:
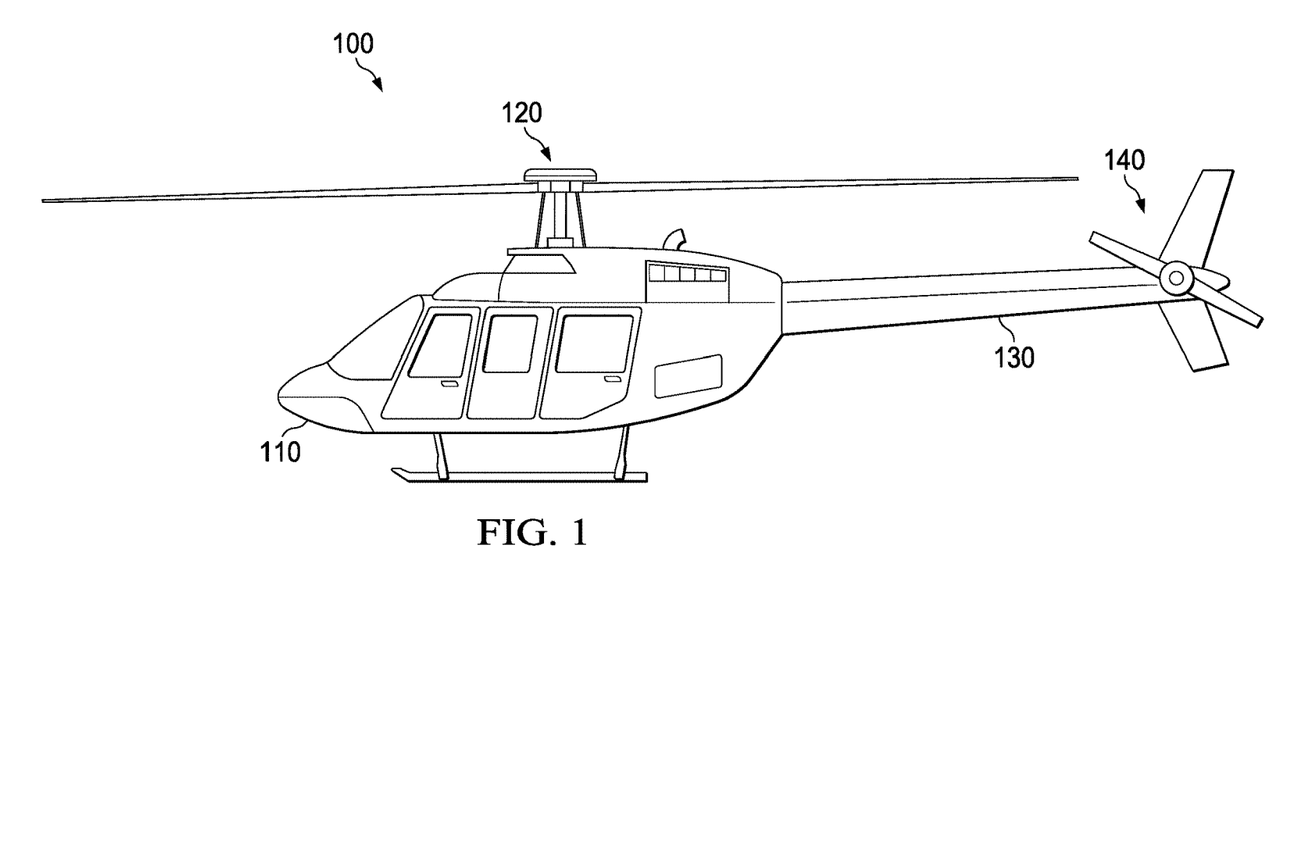
FIG. 1 illustrates an example rotorcraft in accordance with certain embodiments.

FIG. 1 illustrates an example embodiment of a rotorcraft 100. Rotorcraft 100 includes a fuselage 110, a rotor system 120, and an empennage 130. The fuselage 110 is the main body of the rotorcraft, which may include a cabin for the crew, passengers, and/or cargo, and may also house certain mechanical and electrical components, such as the engine(s), transmission, and flight controls. The rotor system 120 is used to generate lift for the rotorcraft using a plurality of rotating rotor blades. For example, torque generated by the rotorcraft engine(s) causes the rotor blades to rotate, which in turn generates lift. Moreover, the pitch of each rotor blade can be adjusted in order to selectively control direction, thrust, and lift for the rotorcraft 100. The empennage 130 is the tail assembly of the rotorcraft. In some embodiments, the empennage 130 may include horizontal and/or vertical stabilizers, which may be respectively used for horizontal stability and vertical stability. The empennage 130 may also include a mechanism for providing anti-torque and/or directional control, such as a tail rotor system 140.

There are many hazards that may arise during operation of rotorcraft and other aircraft, including collisions, contact with moving components (e.g., rotors, propellers, and jet engine intakes), landing on uneven, obstructed, or otherwise dangerous surfaces, and so forth. For example, the rotors of a rotorcraft 100 (e.g., main rotor 120 and/or tail rotor 140) present a risk of contact with objects, such as people, animals, structures (e.g., buildings, powerlines), terrain (e.g., the ground and other landing surfaces), and so forth. Moreover, many hazards may be difficult for a pilot to identify, as they may be outside the pilot's field of view or otherwise difficult for the pilot to see. Accordingly, embodiments of a visual sensor system for detecting and responding to hazards during operation of an aircraft are described throughout this disclosure.

The visual sensor system embodiments described throughout this disclosure may detect and respond to hazards using a collection of sensors and/or cameras selectively positioned throughout an aircraft. For example, sensors can be used to identify the operating environment and/or situational context of an aircraft, including objects, people, animals, structures, and/or terrain in the vicinity of the aircraft. Moreover, cameras can be selectively positioned on the aircraft to provide the pilot with meaningful perspectives of the aircraft and its surroundings, including any detected hazards and their locations relative to the aircraft. In some embodiments, for example, a camera may be selectively positioned to capture a portion of the aircraft and its surroundings, thus showing any surrounding hazards and their location relative to the aircraft. In some cases, the sensors used to detect hazards may be positioned separately from the cameras used to capture visual perspectives of the relative position of the hazards. For example, sensors that are used to detect hazards near a particular portion of an aircraft may be positioned at or near the relevant portion of the aircraft, while an associated camera may be positioned further away to provide a view that shows the relevant portion of the aircraft and the surrounding hazards. By contrast, placing the camera near the same portion of the aircraft that the sensors are being used to monitor may result in a camera perspective that only shows nearby hazards in isolation, without also showing the relevant portion of the aircraft, thus providing no visual context of the hazard's location relative to the aircraft.

In some embodiments, for example, the visual sensor system may include sensors positioned near the tail rotor of a rotorcraft to detect hazards near the tail rotor, and may also include an associated camera positioned away from the tail rotor (e.g., near the forward end of the tail boom). In this manner, the sensors are able to detect hazards near the tail rotor, and the camera provides a perspective that shows both the tail rotor and the surrounding hazards. As another example, the visual sensor system may include sensors positioned near the top of a rotorcraft to detect hazards above the rotorcraft and/or near the main rotor. In such embodiments, the visual sensor system may also include an associated camera positioned on the rotorcraft to capture a view of the upper portion of the rotorcraft and any hazards immediately above. For example, in some embodiments, a camera may be positioned on the tail of the rotorcraft and aimed towards the top of the rotorcraft. As another example, the visual sensor system may include sensors positioned on or near the bottom of a rotorcraft to detect hazards below the rotorcraft, such as dangerous landing conditions. Accordingly, in this manner, the visual sensor system can incorporate a collection of sensors and associated cameras to detect and monitor hazards near various portions of an aircraft.

Moreover, in some embodiments, the visual sensor system may integrate or combine data from cameras and sensors. In some embodiments, for example, the video display of a camera may be overlaid with information about a hazard that is determined using sensors. For example, if a hazard detected by the sensors is not within view of the camera, a graphical representation of the hazard may be superimposed on the video display using data from the sensors. The visual sensor system, for example, may use the sensor data to visually plot the hazard on the video display at the appropriate location relative to the camera perspective. In addition, or alternatively, the visual sensor system may display information about the hazard on the video display, such as the distance, velocity, traveling direction, and/or trajectory of the hazard, among other examples.

In this manner, the visual sensor system facilitates situational awareness by identifying the operating environment and situational context of an aircraft, including objects, people, animals, structures, or terrain that are within the vicinity of the aircraft. In some embodiments, for example, the visual sensor system may include a variety of sensors for detecting motion, distance, proximity, heat, visuals, and/or sound, among other examples. Moreover, in some embodiments, the visual sensor system may be implemented using lightweight and inexpensive "off-the-shelf" sensors with relatively short range (e.g., 20-30 feet). Any type and/or combination of sensors can be used, including optical sensors (e.g., light detection and ranging (LIDAR) or other laser rangefinders, infrared (IR) sensors, ultraviolet (UV) sensors, cameras), radio-based sensors (e.g., radar, ultrasonic sensors), sound or acoustic sensors (e.g., microphones), thermal sensors, electromagnetic sensors, and so forth.

Moreover, in some embodiments, a visual sensor system may leverage multiple sensor technologies to enhance the sophistication and performance of the situational awareness functionality. For example, multiple sensor technologies can be used to determine when an object comes within a certain vicinity of an aircraft, the distance and/or location of the object relative to the aircraft, the velocity, direction, angle, and/or trajectory of the object, the size and shape of the object, whether the object is living, the type of object, and so forth. For example, proximity, distance, and/or motion sensors can be used to detect a nearby object and determine its relative distance, location, and/or movement, visual sensors can be used to determine the size and shape of the object, thermal sensors can be used to determine whether the object is living (e.g., based on heat emitted by the object), and so forth. Moreover, various equipment and/or sensors can be used to identify the operational or flight status of the aircraft, such as whether the aircraft is grounded or in-flight, its altitude, speed, and direction, the flight mode (e.g., hover, forward flight, ascent, descent), and so forth. The type of object can then be identified based on the situational information collectively obtained from the various sources, such as the size and shape of the object, visuals or images of the object, whether it is living, the sounds that it emits, the circumstances in which it is encountered, and so forth. For example, an object may be determined to be a bird if the object is living, has a size and/or shape that resembles a bird, and is encountered in the air (e.g., during flight). As another example, an object may be determined to be a human if the object is living, has a size and/or shape that resembles a human, and is encountered on the ground. Other types of objects may be identified in a similar manner, including buildings and other structures, powerlines, terrain, and so forth. In this manner, the sensors may be used to accurately detect hazards, such as objects approaching an aircraft or dangerous landing conditions, among other examples.

In some cases, the output of a sensor or camera may be subjected to noise. Accordingly, in some embodiments, the visual sensor system may reduce certain types of noise. For example, a sensor or camera could be obstructed by a nearby rotor or propeller that rotates through the field of view of the sensor or camera. Accordingly, in some embodiments, the visual sensor system may filter out the rotor blade or propeller from the sensor or camera output. In some cases, for example, the rotor blade or propeller may be filtered from the sensor or camera output based on the rotation frequency or rotations-per-minute (RPMs) of the rotor blade or propeller. For example, the frame capture rate of a camera may be synchronized with the RPMs of the rotor blade or propeller to avoid capturing frames when the camera is obstructed by the rotor blade or propeller. The capture rate of a sensor may be configured in a similar manner to avoid capturing data when obstructed by the rotor blade or propeller. Alternatively, the RPMs of the rotor blade or propeller may be used to filter the output of a sensor or camera to remove data captured during obstructions from the rotor blade or propeller. In this manner, the sensor or camera can "see through" a rotor blade or propeller. As another example, the vibrations of an aircraft may cause a sensor or camera to move or vibrate, which may introduce noise into the output of the sensor or camera. For example, a camera on the tail boom or tail rotor of a rotorcraft may shake during flight due to vibrations from the rotorcraft. Accordingly, noise from vibrations may be filtered from the sensor or camera output, thus stabilizing the sensor or camera. In some embodiments, for example, a gyroscope could be used to filter noise caused by vibrations. In this manner, for example, a camera view may appear stabilized or still even when the camera is subjected to vibrations.

Moreover, upon detecting a potential hazard, the visual sensor system may perform various remedial measures to minimize the risk presented by the hazard, such as providing a notification or warning to the appropriate personnel (e.g., to a pilot, ground operator, or nearby aircraft or vehicle), displaying a camera view of the hazard to the pilot and/or superimposing a graphical representation of the hazard onto a camera view of the aircraft, adjusting the flight path of the aircraft, deploying a physical safety barrier (e.g., an airbag) between the aircraft and the hazard, shutting off and/or stopping an engine or rotor, using the thrust of an engine or rotor to push an object away from the aircraft and/or generate a burst of air as a warning to the object (e.g., assuming the object is in the thrust path), and so forth. In some embodiments, for example, the visual sensor system may provide notifications or warnings about nearby hazards using audible or visual cues (e.g., beeps, grawls, horns, flashing lights, strobe lights) and/or vibrations (e.g., vibrations in the pedals, cyclic stick, or seat pan), among other examples. The particular remedial measures performed by the visual sensor system may vary based on the circumstances, including the type of hazard identified, among other factors.

The embodiments of a visual sensor system described throughout this disclosure provide numerous technical advantages, including, for example, accurately detecting and/or responding to hazards using a variety of sensor technologies and/or cameras selectively positioned on an aircraft. The described embodiments can be implemented in a cost-efficient manner using lightweight and inexpensive sensors (e.g., "off-the-shelf" sensors and/or existing sensor technologies). The described embodiments can also display meaningful views of detected hazards, for example, using selectively positioned cameras that provide optimal views of the hazards (e.g., views showing the hazards relative to the aircraft), and/or incorporating visual representations of hazards onto the camera views using data from sensors. The described embodiments can also perform various other remedial measures to minimize and/or eliminate the risk presented by hazards, such as providing notifications and/or warnings, altering flight paths, shutting off or stopping engines or rotors, and so forth. The described embodiments may integrate a novel and unique combination of hardware and software that greatly improves situational awareness during operation of an aircraft, thus resulting in significantly increased safety. The safety benefits are particularly advantageous to rotorcraft and other aircraft with unprotected rotors and/or propellers that can potentially contact static and dynamic objects external to the aircraft, as the risk of dangerous contact can be minimized or avoided using the described embodiments. Moreover, reducing the risk of contact with a rotor or propeller is particularly beneficial to rotorcraft and other aircraft capable of vertical take-off and landing (VTOL).

Example embodiments of a visual sensor system are described below with more particular reference to the remaining FIGURES. Moreover, it should be appreciated that rotorcraft 100 of FIG. 1 is merely illustrative of a variety of aircraft and other vehicles that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, drones, and other propeller and/or jet engine aircraft, among other examples. The embodiments described throughout this disclosure can similarly be implemented in any other type of vehicle, including land-based vehicles and water-based vehicles.

Figure 2A:
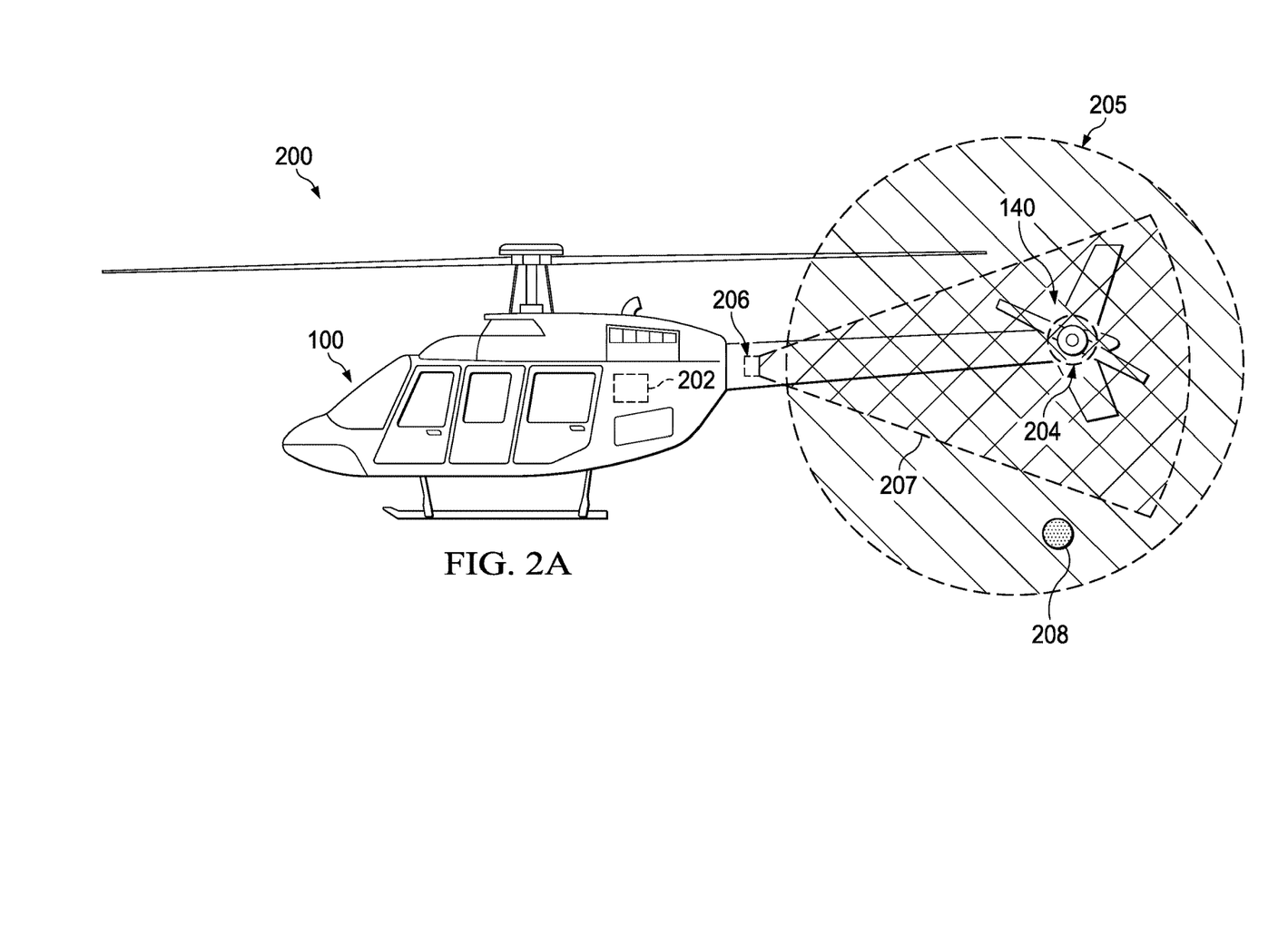
FIGS. 2A and 2B illustrate an example embodiment of a visual sensor system for a rotorcraft tail rotor.
Figure 2B:
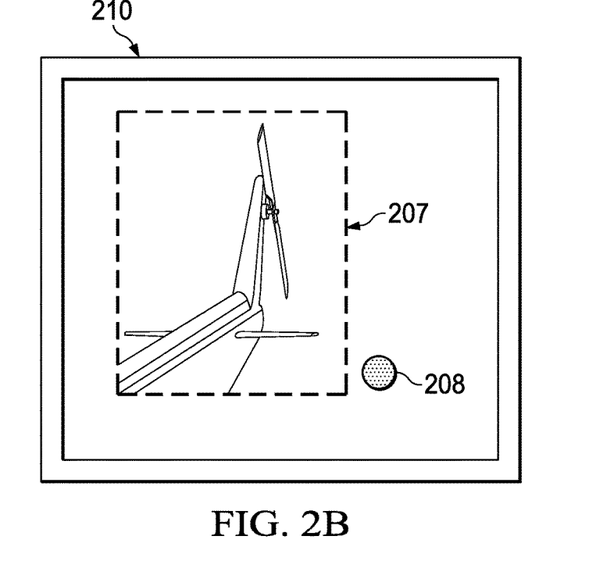

FIGS. 2A and 2B illustrate an example embodiment of a visual sensor system 200 for the tail rotor of a rotorcraft. As described further below, FIG. 2A illustrates an example embodiment of a rotorcraft with visual sensor system 200, and FIG. 2B illustrates an example embodiment of a display for providing a view of hazards detected by visual sensor system 200.

FIG. 2A illustrates an example embodiment of a rotorcraft 100 with a visual sensor system 200 for detecting and responding to hazards near the tail rotor 140. In some cases, for example, the tail rotor 140 may present a dangerous risk of contact with static and dynamic objects external to rotorcraft 100, particularly during vertical take-off and landing (VTOL). This risk presented by the tail rotor 140, however, can be minimized or avoided using visual sensor system 200, as described further below.

In the illustrated example, visual sensor system 200 includes a visual control system 202, one or more sensors 204, and a camera 206. Visual control system 202 may be used to control the operation of visual sensor system 200. In some embodiments, for example, visual control system 202 may be a collection of hardware and/or software configured to control visual sensor system 200. Sensors 204 may be used to detect hazards near the tail rotor 140 of rotorcraft 100, such as objects, people, animals, structures, surfaces, and/or terrain within the vicinity of the tail rotor 140. Sensors 204 may include a variety of types of sensors and/or sensor technologies, as described above in connection with FIG. 1. In the illustrated example, sensors 204 are selectively positioned near the tail rotor 140 for optimal detection of hazards near the tail rotor 140. For example, sensors 204 may be arranged to detect objects that come within a particular distance of the tail rotor 140 in any direction, thus resulting in a sensor range 205 that forms a protective sphere around the tail rotor 140. Camera 206 may be used to provide a camera view of hazards detected by visual sensor system 200. Camera 206 (or a collection of cameras 206) may be selectively positioned on rotorcraft 100 to provide an optimal view of hazards detected near the tail rotor 140, such as a view that provides spatial recognition by showing the hazards relative to the tail rotor 140. In the illustrated example, camera 206 is positioned away from the tail rotor 140, near the forward end of the tail boom of rotorcraft 100, in order to provide a camera view 207 that shows both the tail rotor 140 and any surrounding hazards. By contrast, placing the camera near the tail rotor may result in a perspective that shows hazards near the tail rotor in isolation (e.g., without showing the tail rotor itself), thus providing no visual context showing the hazard's location relative to the rotorcraft. In the illustrated example, an object 208 near the tail rotor 140 is within the sensor range 205 but outside of the camera view 207. Accordingly, in some embodiments, if an object detected by the sensors 204 is not within the camera view 207, a graphical representation of the object may be superimposed on the camera feed using data from the sensors 204, as described below in connection with FIG. 2B.

In this manner, visual sensor system 200 may include an arrangement of sensors 204 and/or cameras 206 to provide depth perception for protective spherical zones around the tail rotor 140 (e.g., a sphere with a defined radius of 10-15 feet). The location of static and dynamic objects in the proximity of the tail rotor 140 can be detected and analyzed, and appropriate remedial measures may be performed, such as providing warning(s) to the pilot. For example, sensors 204 may be used to observe all objects within their respective fields of view, and based on the data from sensors 204, visual control system 202 may perform geolocation techniques such as triangulation to locate the objects in space relative to the tail rotor 140. Moreover, based on the location and movement of an object, the pilot may be given visual and/or audible cues as to the nature and risk of colliding with the object. In some embodiments, for example, the visual sensor system 200 may provide notifications or warnings about nearby hazards using audible or visual cues (e.g., beeps, grawls, horns, flashing lights, strobe lights) and/or vibrations (e.g., vibrations in the pedals, cyclic stick, or seat pan), among other examples. Moreover, in some embodiments, increasing levels of warning may be provided to the pilot based on the proximity of an object to the tail rotor 140, such as an increasing number and/or increasing volume of audible cues as an object approaches the tail rotor 140. Other remedial measures may also be performed to minimize the risk presented by an object near the tail rotor 140, such as displaying a camera view of the object to the pilot and/or superimposing a graphical representation of the object onto a camera view of the tail rotor 140, adjusting the flight path of the rotorcraft, shutting off and/or stopping the tail rotor 140, and so forth. In some embodiments, if an object is within the thrust path of the tail rotor 140, the collective thrust of the tail rotor 140 may be used to push the object away and/or generate a burst of air as a warning to the object. The particular remedial measures performed by visual sensor system 200 may vary based on the circumstances, including the type of object identified, among other factors.

FIG. 2B illustrates an example embodiment of a display 210 for providing a view of hazards detected by visual sensor system 200 of FIG. 2A. Display 210 may be incorporated into an existing avionics display of an aircraft, or alternatively, display 210 may be implemented using a separate or standalone display. In some embodiments, display 210 may be used to display a camera view 207 or video of hazards near the tail rotor, for example, using the feed provided by camera 206 of FIG. 2A. For example, display 210 may display a camera view 207 showing the tail rotor and any surrounding hazards, thus providing spatial recognition by showing the hazards relative to the tail rotor.

Moreover, in some embodiments, display 210 may display a synthesized view of hazards generated using both sensors and cameras. For example, a camera feed may be combined and/or overlaid with information about a hazard determined using sensors. In some embodiments, for example, information about the hazard may be displayed with the camera feed, such as the distance, velocity, traveling direction, and/or trajectory of the hazard, among other examples. Moreover, in some embodiments, if a hazard detected by the sensors is not within view of the camera, a graphical representation of the hazard may be superimposed on the camera feed using data from the sensors. For example, the sensor data may be used to visually plot a 2D or 3D representation of the hazard on display 210 at the appropriate location relative to the camera perspective (e.g., using software in visual control system 202 of FIG. 2A). In some embodiments, the hazard may be represented using a rough approximation or rendering, such as a shape or symbol (e.g., circle, box, star, or dot) that may be blinking or flashing. In other embodiments, the hazard may be represented using a more sophisticated pixelated rendering that provides a more realistic depiction of the hazard. The representation of the hazard may depend on the sophistication of the sensors available to the visual sensor system. Basic distance sensors, for example, may only be capable of determining the location of objects, and thus the objects may be represented using a predetermined shape or symbol. More advanced sensor technologies, however, may enable sophisticated identification of the size, shape, and/or type of objects, thus enabling the objects to be represented using more realistic representations.

In the illustrated example, display 210 is used to display a camera view 207 of the tail rotor using the feed from camera 206 of FIG. 2A. In addition, display 210 is also used to display a graphical representation of an object 208 detected near the tail rotor by sensor(s) 204 and that is not within the camera view 207. In this manner, the pilot can be provided with a view of hazards even when the hazards are outside the camera view.

Figure 3:
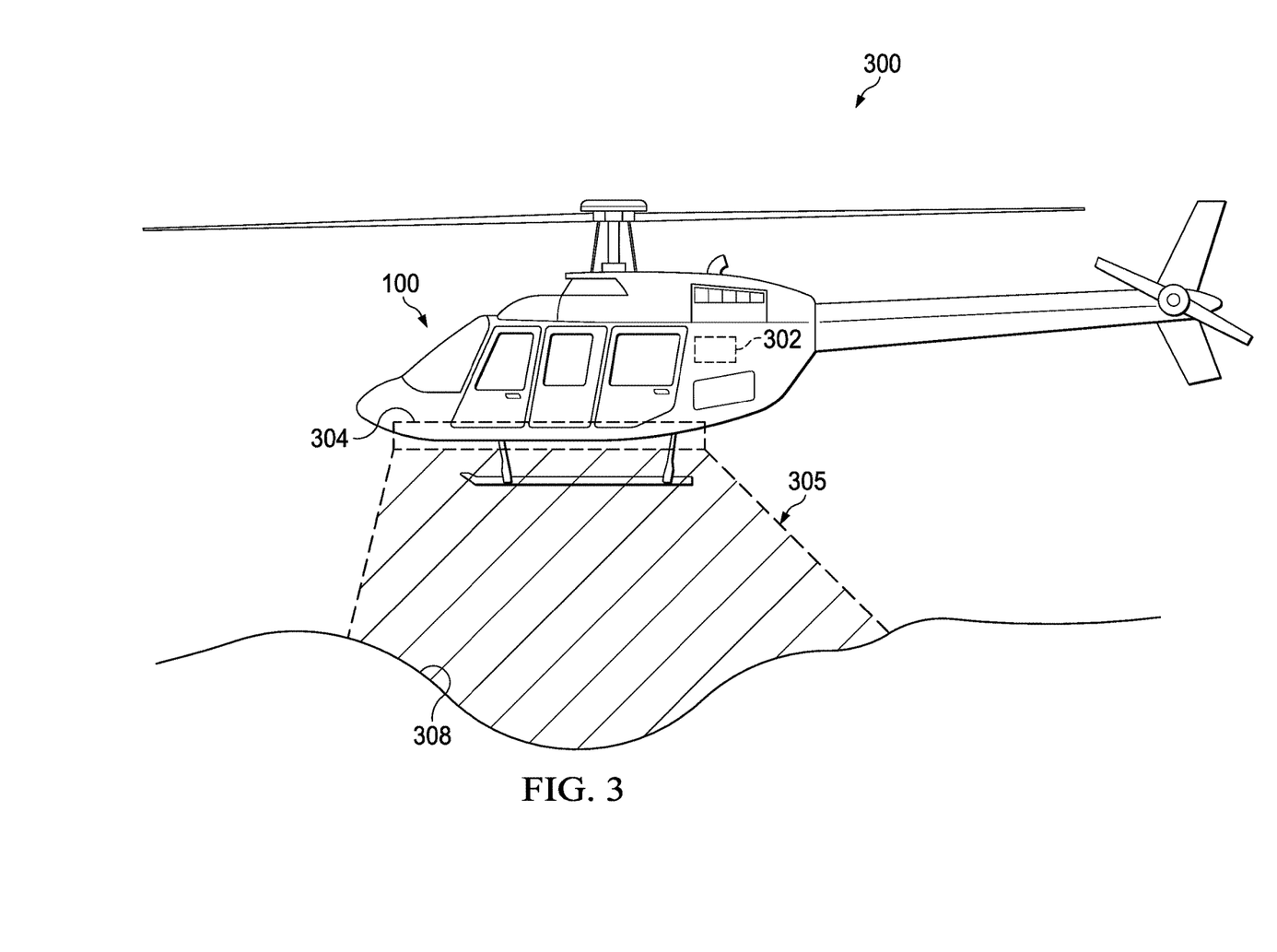
FIG. 3 illustrates an example embodiment of a visual sensor system for detecting hazards below a rotorcraft.

FIG. 3 illustrates an example embodiment of a visual sensor system 300 for detecting hazards below a rotorcraft 100. In the illustrated example, visual sensor system 300 includes a visual control system 302 and one or more sensors 304. Visual control system 302 may be used to control the operation of visual sensor system 300. Sensors 304 may be arranged at or near the bottom of rotorcraft 100, resulting in a sensor range 305 that extends below the rotorcraft, and enabling detection of objects within the sensor range 305. In this manner, visual sensor system 300 may be used to detect hazards below rotorcraft 100, such as objects and/or dangerous landing conditions.

In the illustrated example, the ground surface 308 below rotorcraft 100 is uneven and sloping, and thus may be a dangerous landing surface. Moreover, this dangerous landing surface 308 may be detected by visual sensor system 300 using sensors 304. For example, sensors 304 may be used to detect the distance to different parts of the landing surface 308, allowing visual control system 302 to determine the slope or angle of the surface, or identify any other irregularities on the surface. In this manner, visual sensor system 300 can detect dangerous landing conditions, such as surfaces that are not flat (e.g., an uneven or sloped surface), objects on or protruding from a surface (e.g., rocks, vehicles, personnel, structures), objects hidden by grass, and so forth.

Visual sensor system 300 may then perform the appropriate remedial measures, including notifying the pilot, thus allowing the pilot to make any appropriate landing adjustments, or autonomously performing any appropriate flight or landing adjustments. In some embodiments, for example, a visual or audible notification may be used to inform the pilot of the dangerous landing conditions, such as a warning that the surface is uneven, providing the slope or angle of the surface, and so forth. Moreover, in some embodiments, visual sensor system 300 may include one or more cameras to display a camera view of the dangerous landing conditions. In some embodiments, information from both the camera and sensors may be displayed to the pilot. For example, the camera view may be overlaid with real-time information from the sensors, such as the distance, slope, and/or angle of the landing surface, among other examples.

Figure 4:
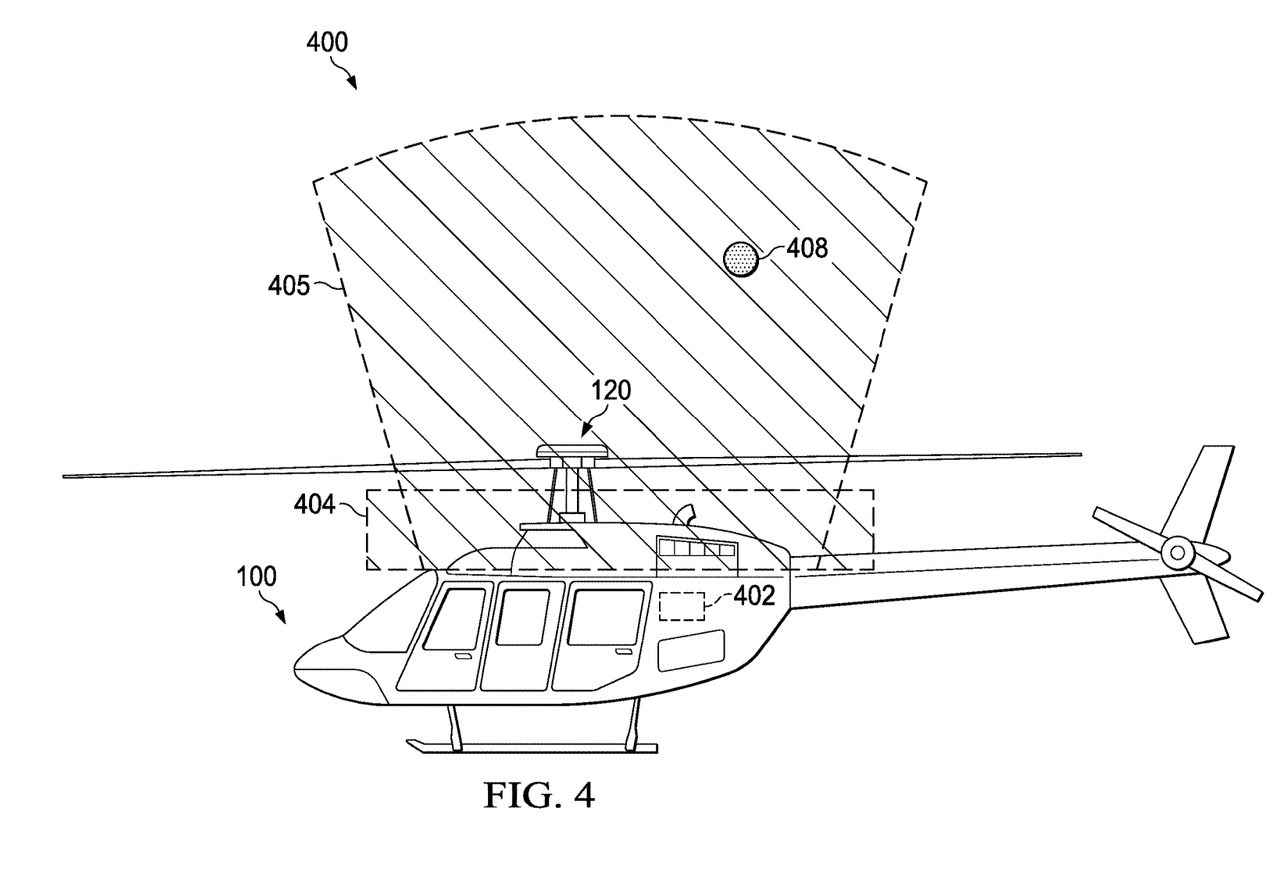
FIG. 4 illustrates an example embodiment of a visual sensor system for detecting hazards above a rotorcraft.

FIG. 4 illustrates an example embodiment of a visual sensor system 400 for detecting hazards above a rotorcraft 100. In the illustrated example, visual sensor system 400 includes a visual control system 402 and one or more sensors 404. Visual control system 402 may be used to control the operation of visual sensor system 400. Sensors 404 may be arranged at or near the top of rotorcraft 100, resulting in a sensor range 405 that extends above the rotorcraft, and enabling detection of objects within the sensor range 405. In this manner, visual sensor system 400 may be used to detect hazards above rotorcraft 100 and/or near the main rotor 120, such as birds or other animals, powerlines, other aircraft or drones, and so forth.

In the illustrated example, an object 408 is above rotorcraft 100 near the main rotor 120, and thus the object 408 presents a dangerous risk of contact or collision with the main rotor 120. The object 408 can be detected and/or identified by visual sensor system 400 using sensors 404, as described throughout this disclosure.

Visual sensor system 400 may then perform the appropriate remedial measures to avoid the risk of contact with the detected object 408, such as providing a notification or warning to the pilot or the object 408, displaying a camera view of the object 408 to the pilot and/or superimposing a graphical representation of the object 408 onto a camera view of the rotorcraft, autonomously adjusting the flight path, shutting off and/or stopping the engine or rotor 120, and so forth. In some embodiments, for example, visual sensor system 400 may provide notifications or warnings about the object 408 using audible or visual cues (e.g., beeps, grawls, horns, flashing lights, strobe lights) and/or vibrations (e.g., vibrations in the pedals, cyclic stick, or seat pan), among other examples. The particular remedial measures performed by the visual sensor system 400 may vary based on the circumstances, including the type of object 408 identified, among other factors.

Figure 5:
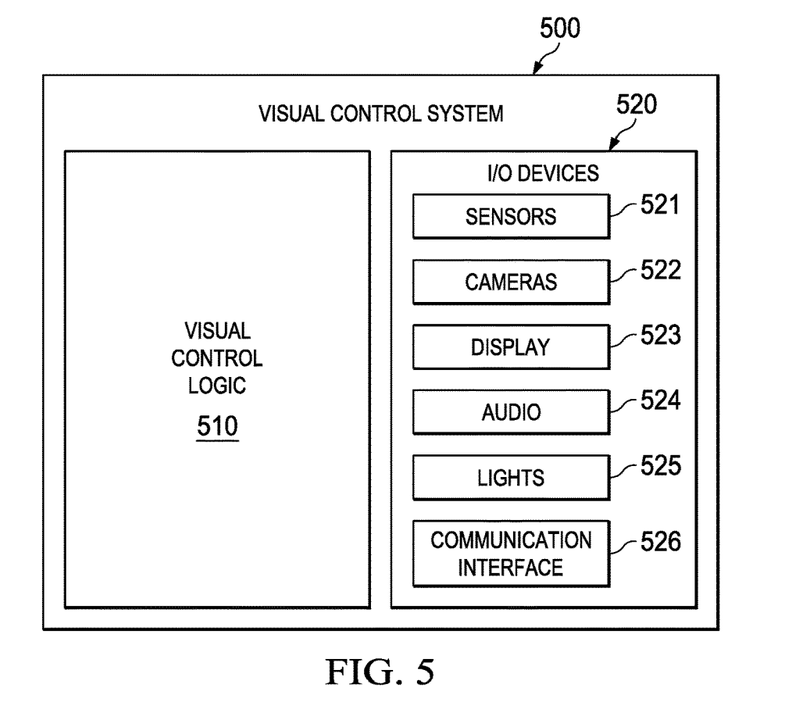
FIG. 5 illustrates a block diagram for an example embodiment of an aircraft visual control system.

FIG. 5 illustrates a block diagram for an example embodiment of an aircraft visual control system 500. Visual control system 500 may be used to control the operation of an aircraft visual sensor system (e.g., the visual sensor systems of FIGS. 1-4), for example, using a combination of hardware and software. Moreover, in some embodiments, visual control system 500 may be implemented as part of a flight control system.

In the illustrated embodiment, flight control system 500 includes visual control logic 510 and a collection of input/output (I/O) devices 520, such as sensors 521, cameras 522, displays 523, audio devices 524, lights 525, communication interfaces 526, and so forth. Sensors 521 may include any components used to detect or measure aspects of the operational environment of the aircraft, as described throughout this disclosure. Cameras 522 may be used to capture video and images of an aircraft and/or its surrounding hazards. Display 523 may be used to display visual cues regarding detected hazards (e.g., displaying camera and/or graphical views of detected hazards). Audio devices 524 may be used to provide audible cues regarding detected hazards (e.g., sounds, notifications, warnings). Lights 525 may be used to provide visual warnings regarding detected hazards. Communication interface 526 may be used to communicate remotely regarding detected hazards (e.g., communicating with ground personnel and/or pilots of other aircraft).

Visual control logic 510 may provide the logic for detecting and responding to hazards near an aircraft, as described throughout this disclosure. Visual control logic 510 may be implemented using hardware and/or software, such as processors, controllers, application specific integrated circuits (ASICs), memory or data storage devices, and/or any associated software or instructions. In some embodiments, for example, visual control logic 510 may include logic for detecting and/or identifying hazards near an aircraft using data from sensors 521 and/or cameras 522, and subsequently triggering the appropriate remedial measures. For example, upon detection of a hazard, visual control logic 510 may trigger a notification or warning to the appropriate personnel (e.g., to a pilot, ground operator, or nearby aircraft or vehicle), display a camera view and/or graphical representation of the hazard to the pilot (e.g., superimpose a graphical representation of the hazard onto a camera view of the aircraft), adjust the flight path of the aircraft, shut off and/or stop an engine or rotor, use the thrust of an engine or rotor to generate a burst of air as a warning to an object (e.g., assuming the object is in the thrust path) and/or push the object away from the aircraft (e.g., using the tail rotor thrust), and so forth. In some embodiments, for example, visual control logic 510 may trigger notifications or warnings about nearby hazards using audible or visual cues (e.g., beeps, grawls, horns, flashing lights, strobe lights) and/or vibrations (e.g., vibrations in the pedals, cyclic stick, or seat pan), among other examples. The particular remedial measures triggered by visual control logic 510 may vary based on the circumstances, including the type of hazard identified, among other factors.

Figure 6:
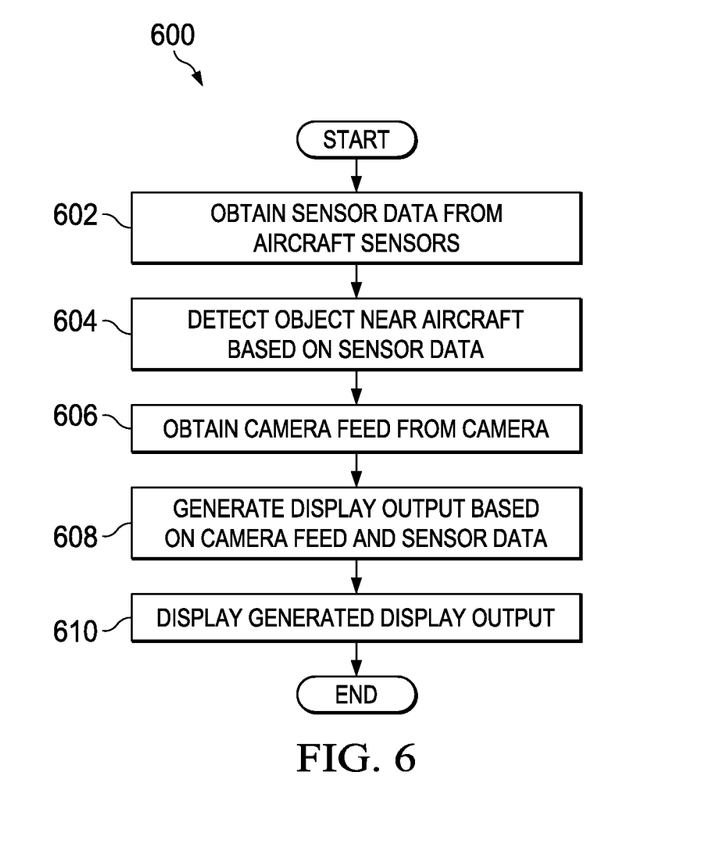
FIG. 6 illustrates a flowchart for an example embodiment of an aircraft visual sensor system.

FIG. 6 illustrates a flowchart 600 for an example embodiment of an aircraft visual sensor system. Flowchart 600 may be implemented, in some embodiments, using the visual sensor system embodiments described throughout this disclosure. Moreover, in some embodiments, flowchart 600 and/or the associated visual sensor system may be implemented as part of a flight control system.

The flowchart may begin at block 602 by obtaining sensor data from one or more sensors associated with an aircraft. The sensors, for example, may be used to detect information associated with an operating environment of the aircraft. In some embodiments, for example, the sensors may include a distance or ranging sensor configured to detect a distance of an object from the aircraft, an optical sensor configured to detect one or more visual attributes of the object, a thermal sensor configured to detect heat emitted from the object, an acoustic sensor to detect sound, and/or any other type of sensor, including those discussed throughout this disclosure.

The flowchart may then proceed to block 604 to detect an object near the aircraft based on the sensor data. For example, the sensor data may be used to detect a nearby object, determine a location of the object relative to the aircraft, determine a shape or size of the object, determine a type of the object, and so forth. Moreover, in some embodiments, the sensor data may be used to detect an object near a particular portion of an aircraft, such as near the propellers or rotors of an aircraft (e.g., the tail rotor of a rotorcraft).

The flowchart may then proceed to block 606 to obtain a camera feed from a camera associated with the aircraft. In some embodiments, for example, the camera feed may comprise a camera view of at least a portion of the aircraft, such as a portion of the aircraft that is being monitored using the sensors.

The flowchart may then proceed to block 608 to generate a display output based on the camera feed and the sensor data. In some embodiments, the display output may include a visual perspective of the detected object relative to the aircraft. For example, the visual perspective may be the camera view from the camera feed, a visual representation generated using the sensor data, and/or a combination of both. In some embodiments, it may be determined, based on the location of the object relative to the aircraft, that the object is outside the camera view. Accordingly, the display output may be generated to include a visual representation of the object relative to the camera view.

The flowchart may then proceed to block 610 to cause the display output to be displayed on a display device. The display device, for example, may be a device that can be viewed by the pilot to provide context regarding the object detected near the aircraft. In some embodiments, other remedial measures may be performed when an object is detected near the aircraft, such as providing an audible or visual warning, autonomously adjusting a flight path, directing the thrust of a rotor or engine towards the object, and so forth.

At this point, the flowchart may be complete. In some embodiments, however, the flowchart may restart and/or certain blocks may be repeated.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The embodiments described throughout this disclosure may be implemented using logic, instructions, and/or other information stored on any suitable type of tangible, non-transitory storage medium (e.g., random access memory (RAM), read only memory (ROM), field programmable gate arrays (FPGA), erasable programmable read only memory (EPROM), electrically erasable programmable ROM (EEPROM), microcode, magnetic and/or disc based storage mediums), software, hardware (for example, processor instructions or microcode), or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An apparatus, comprising:
   a processing device configured to:
      obtain sensor data from one or more sensors associated with a rotorcraft, wherein the one or more sensors are configured to detect information associated with an operating environment of the rotorcraft;
      detect an object near the rotorcraft based on the sensor data;
      obtain a camera feed from a camera associated with the rotorcraft, wherein the camera feed comprises a camera view of at least a portion of the rotorcraft;
      generate a display output based on the camera feed and the sensor data, wherein the display output comprises a visual perspective of the object relative to the rotorcraft;
      cause the display output to be displayed on a display device;
      determine a physical characteristic of the object based on the sensor data; and
      automatically adjust operation of the rotorcraft based on the determined physical characteristic of the object.

2. The apparatus of claim 1, wherein the processing device is further configured to determine a location of the object relative to the rotorcraft based on the sensor data.

3. The apparatus of claim 2, wherein the processing device configured to generate the display output based on the camera feed and the sensor data is further configured to:
   determine, based on the location of the object relative to the rotorcraft as indicated by the sensor data, that the object is outside the camera view; and
   generate a visual representation of the object on the display view based on the location of the object relative to the rotorcraft.

4. The apparatus of claim 1, wherein the processing device is further configured to determine a size of the object based on the sensor data.

5. The apparatus of claim 1, wherein the processing device is further configured to determine a type of the object based on the sensor data.

6. The apparatus of claim 5:
wherein the one or more sensors comprises a plurality of sensors associated with a plurality of sensor technologies; and
wherein the processing device configured to determine the type of the object based on the sensor data is further configured to determine the type of the object based on the sensor data from the plurality of sensor technologies.

7. The apparatus of claim 6, wherein the plurality of sensors comprises:
a distance sensor configured to detect a distance of the object from the rotorcraft;
an optical sensor configured to detect one or more visual attributes of the object; and
a thermal sensor configured to detect heat emitted from the object.

8. The apparatus of claim 1, wherein the processing device configured to detect the object near the rotorcraft based on the sensor data is further configured to detect the object near a rotor of the rotorcraft.

9. The apparatus of claim 8, wherein the rotor comprises a tail rotor, and wherein the processing device is further configured to cause the tail rotor to generate a thrust towards the object.

10. The apparatus of claim 1, wherein the processing device is further configured to trigger a warning to indicate that the object is detected near the rotorcraft.

11. The apparatus of claim 10, wherein the warning comprises an audible notification.

12. The apparatus of claim 10, wherein the warning comprises a visual notification.

13. The apparatus of claim 10, wherein the warning comprises a vibration in a component of the rotorcraft.

14. The apparatus of claim 10, wherein the processing device is further configured to deploy a safety barrier between the rotorcraft and the object.

15. The apparatus of claim 1, wherein the processing device is further configured to adjust a flight path of the rotorcraft based on the object detected near the rotorcraft.

16. A non-transitory machine accessible storage medium having instructions stored thereon, wherein the instructions, when executed on a machine, cause the machine to:
obtain sensor data from one or more sensors associated with a rotorcraft, wherein the one or more sensors are configured to detect information associated with an operating environment of the rotorcraft;
detect an object near the rotorcraft based on the sensor data;
obtain a camera feed from a camera associated with the rotorcraft, wherein the camera feed comprises a camera view of at least a portion of the rotorcraft;
generate a display output based on the camera feed and the sensor data, wherein the display output comprises a visual perspective of the object relative to the rotorcraft;
cause the display output to be displayed on a display device;
determine a physical characteristic of the object based on the sensor data; and
automatically adjust operation of the rotorcraft based on the determined physical characteristic of the object.

17. The storage medium of claim 16, wherein the instructions further cause the machine to determine a location of the object relative to the rotorcraft based on the sensor data.

18. The storage medium of claim 17, wherein the instructions that cause the machine to generate the display output based on the camera feed and the sensor data further cause the machine to:
determine, based on the location of the object relative to the rotorcraft as indicated by the sensor data, that the object is outside the camera view; and
generate a visual representation of the object on the display view based on the location of the object relative to the rotorcraft.

19. The storage medium of claim 16, wherein the instructions further cause the machine to determine a type of the object based on the sensor data.

20. The storage medium of claim 19:
wherein the one or more sensors comprises a plurality of sensors associated with a plurality of sensor technologies; and
wherein the instructions that cause the machine to determine the type of the object based on the sensor data further cause the machine to determine the type of the object based on the sensor data from the plurality of sensor technologies.

21. The storage medium of claim 20, wherein the plurality of sensors comprises:
a distance sensor configured to detect a distance of the object from the rotorcraft;
an optical sensor configured to detect one or more visual attributes of the object; and
a thermal sensor configured to detect heat emitted from the object.

22. The storage medium of claim 16, wherein the instructions that cause the machine to detect the object near the rotorcraft based on the sensor data further cause the machine to detect the object near a rotor of the rotorcraft.

23. The storage medium of claim 16, wherein the instructions further cause the machine to adjust a flight path of the rotorcraft based on the object detected near the rotorcraft.

24. A method, comprising:
obtaining sensor data from one or more sensors associated with an rotorcraft a rotorcraft, wherein the one or more sensors are configured to detect information associated with an operating environment of the rotorcraft;
detecting an object near the rotorcraft based on the sensor data;
obtaining a camera feed from a camera associated with the rotorcraft, wherein the camera feed comprises a camera view of at least a portion of the rotorcraft;
generating a display output based on the camera feed and the sensor data, wherein the display output comprises a visual perspective of the object relative to the rotorcraft;
causing the display output to be displayed on a display device;
determining a physical characteristic of the object based on the sensor data; and
automatically adjusting operation of the rotorcraft based on the determined physical characteristic of the object.

25. A rotorcraft, comprising:
one or more sensors configured to detect information associated with an operating environment of the rotorcraft;
a camera configured to generate a camera feed, wherein the camera feed comprises a camera view of at least a portion of the rotorcraft;
a display device; and a processing device configured to:
   obtain sensor data from the one or more sensors;
   detect an object near the rotorcraft based on the sensor data;
   obtain the camera feed from the camera;
   generate a display output based on the camera feed and the sensor data, wherein the display output comprises a visual perspective of the object relative to the rotorcraft;
   cause the display output to be displayed on a display device;
   determine at least one of a location of the object relative to the rotorcraft and a physical characteristic of the object based on the sensor data; and
   automatically adjust operation of the rotorcraft based on at least one of the determined location of the object relative to the rotorcraft and the physical characteristic of the object.

* * * * *

Disclaimer

10,243,647 B2 - Michael John Ryan, Colleyville, TX (US); Joseph Scott Drennan, Dallas, TX (US). AIRCRAFT VISUAL SENSOR SYSTEM. Patent dated March 26, 2019. Disclaimer filed November 16, 2022, by the assignee, Bell Helicopter Textron Inc.

I hereby disclaim the following complete claims 1-8, 10-13 and 15-25 of said patent.

*(Official Gazette, May 16, 2023)*